July 1, 1958     D. V. TUTTLE     2,841,680
CONTROL DEVICE FOR ELECTRIC HEATING CIRCUITS
Filed March 1, 1954     2 Sheets-Sheet 1

INVENTOR.
DANIEL V. TUTTLE
BY
Oberlin & Limbach
ATTORNEYS.

July 1, 1958     D. V. TUTTLE     2,841,680
CONTROL DEVICE FOR ELECTRIC HEATING CIRCUITS
Filed March 1, 1954     2 Sheets-Sheet 2

INVENTOR.
DANIEL V. TUTTLE
BY
Oberlin & Limbach
ATTORNEYS.

United States Patent Office 2,841,680
Patented July 1, 1958

2,841,680

CONTROL DEVICE FOR ELECTRIC HEATING CIRCUITS

Daniel V. Tuttle, Kirkland, Ill., assignor, by mesne assignments, to Ferro Corporation, Cleveland, Ohio, a corporation of Ohio Application March 1, 1954, Serial No. 413,239

3 Claims. (Cl. 219—20)

This invention relates as indicated to electrical control devices and has more particular reference to control devices used for the purpose of individually controlling the temperature and total heating time of the plural heating units found in domestic appliances such as stoves, ranges, heaters and the like.

Heating units have been provided with motor-operated control devices which will control the wattage input to the unit by cyclically making and breaking the circuit from the supply line to the load at some preselected rate. To obtain temperatures of higher magnitude these devices are so constructed as to maintain the heating unit energized for a greater percentage of the time, while peak temperature is obtained by continuous energization.

It is a principal object of my invention to provide an electrical control device having connected therewith a single constant speed motor, which single motor controls both the wattage input into a heating unit and simultaneously controls a timing mechanism for automatically turning off the heating unit at a preselected time.

It is a further object of this invention to provide a control system whereby a plurality of heating units may be controlled by individual control devices located at any convenient place on the appliance and so interconnected that it is necessary to use only a single motor for the purposes stated above.

A still further object of this invention is to provide a control system whereby one or more of the interconnected switches can be turned off without effecting the functioning of the remaining operating switches.

Other objects of my invention will appear as the description proceeds.

To the accomplishment of the foregoing and related ends, the invention, then comprises the features hereinafter fully described and particularly pointed out in the claims, the following description and the annexed drawings setting forth in detail one illustrative embodiment of the invention, this being indicative however, of but one of the various ways in which the principle of the invention may be employed.

Figure 1:
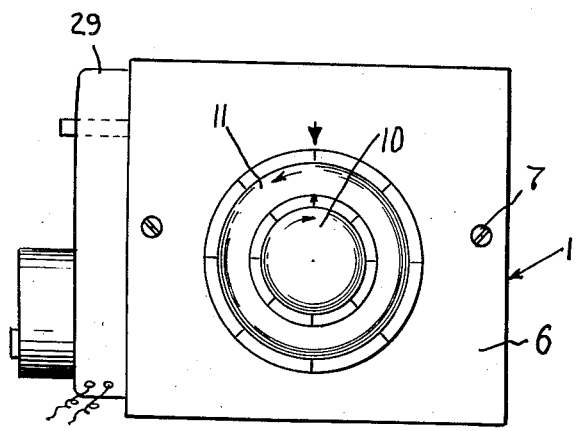
Fig. 1 is a front view of a control device constructed in accordance with this invention.
Figure 2:
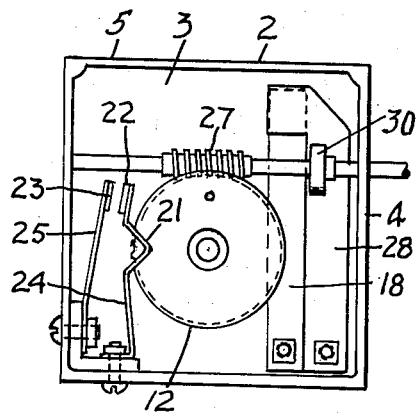
Fig. 2 is a front view with cover removed to show the contacts and operating cams.
Figure 3:
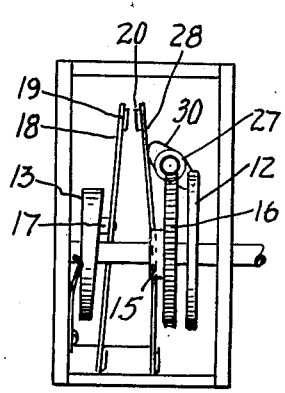
Fig. 3 is a transverse sectional view of the control illustrated in Fig. 1, the parts shown in this figure being in the off position.
Figure 4:
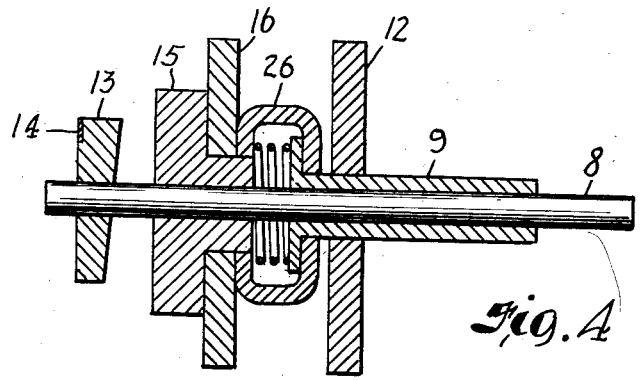
Fig. 4 is an enlarged view of the control shafts and cams of Fig. 3.

Referring now more specifically to the drawings and more especially to Fig. 1, there is here illustrated a front view of a control device constructed in accordance with this invention, the reference numeral 1 indicates the switch as a whole which comprises a casing 2 of insulating material such as Bakelite, having a main compartment 3 for the switch elements and composed of side and end walls 4 and 5 respectively and a bottom wall (not shown here).

A cover 6 is provided to close the open side of the casing 2 and is secured thereto as by screws 7. If this cover is of metal a sheet of insulating material (not shown here) is provided at the inner side of the cover and coextensive therewith and is secured in place by the cover screws 7. This cover 6 has a central opening (not shown here) (and the insulation a matching opening) for the temperature control shaft 8 and time control shaft 9. Temperature control shaft 8 is inserted through time control shaft 9 (and is freely rotatable therein) and is journalled in the opposite wall of the casing 2.

A knob 11 is secured on the outer portion of time control shaft 9 which projects through the central opening of cover 6. Similarly a knob 10 is secured on the outer projecting portion of temperature control shaft 8. On shaft 8 substantially adjacent the end which is journalled in case 1 is located temperature cam 13. Clockwise rotation of shaft 8 turns cam 13 which is in contact with rider 17. Rider 17 which is attached to blade 18 causes blade 18 to move contact point 19 closer or farther away from contact point 20 which is attached to blade 28, thus predetermining the number of times contact points 19 and 20 close during a given cycle. A counterclockwise rotation of shaft 9 turns timing cam 12 which is fixed thereto. This counterclockwise motion starts the control device in operation by bringing together contact points 22 and 23 and the control device remains in operation until cam 12 returns to such a position where blade 24 falls into escapement 21 thus opening the circuit. Shaft 9 and cam 12 are connected to worm gear 16 by a slip clutch generally indicated at 26. Worm gear drive 16 is fixed to collar 15. Worm 27 which is connected to motor 29 is journalled on its opposite end in case 1, or as will be hereinafter explained extends thru the case where it can be coupled by a flexible shaft to another control device. Fixed to worm 27 is cycle cam 30 which upon rotation of the worm 27 is effective to cause the blade 28 to flex back and forth so as to cyclically move the contact point 20 toward and away from the contact point 19. When the cam 30 rotates, the length of time during each such cycle of rotation during which the contact points 19 and 20 are closed will depend upon the physical position of the contact 19 in the path of movement of the contact point 20. Thus by turning knob 10 cam 13 will force contact point 19 further from or closer to contact point 20. The closer the contact point 19 is to 20 the longer will be the time contact point 20 will touch contact point 19.

As previously indicated a single control device of my invention may be assembled with a plurality of such controls all operated by a single motor. Each of the control devices being identical with the other excepting that one of such controls will have associated therewith a driving motor. Each of the control devices is interconnected as by a flexible shaft (not shown here) connected to worm 27. The addition of one other set of contacts operating in unison with the timing contacts 22 and 23 will allow any number of switches to be ganged together having one common drive motor yet maintaining time control for each individual control device. Thus if contact points 22a—22aa and 23a—23aa are substituted for 22 and 23 respectively, a plurality of controls may be operated from a single drive motor.

Figure 7:
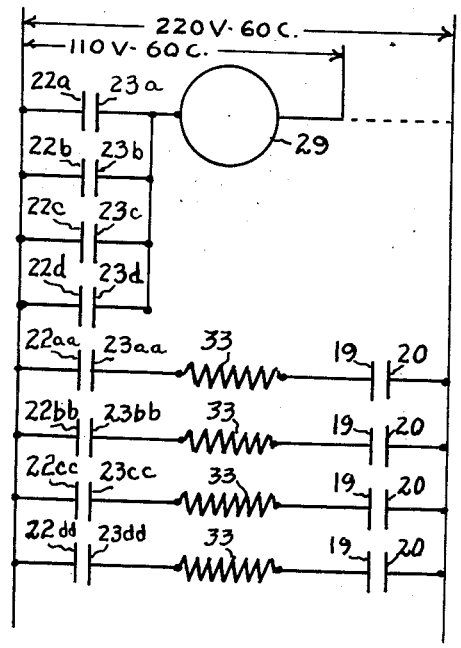
Fig. 7 is a schematic wiring diagram which is used when two or more of said controls are interconnected electrically.

In Fig. 7 there has been illustrated a diagrammatic wiring diagram by which illustration the manner in which the several control devices are electrically interconnected may be observed.

Figure 6:
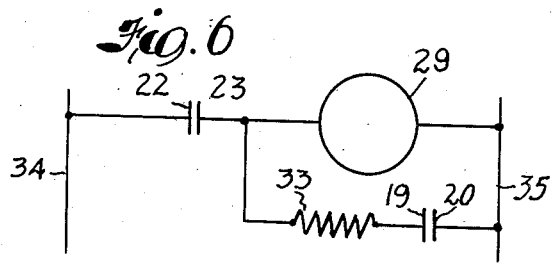
Fig. 6 is a schematic wiring diagram of a single control device of this invention.
Figure 5:
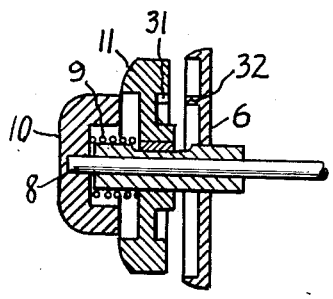
Fig. 5 is a detailed sectional view of the control knobs shown in Fig. 1.

Fig. 6 illustrates a diagrammatic wiring diagram in which a single control device may be operated.

Worm gear 16 and worm 27 may be of such a ratio that a complete revolution of worm gear 16 takes 60 minutes, 120 minutes, etc. thus it will be seen that the timing element of my control can be made to suit the desires of the user. If a manufacturer of electric ranges wishes to install a control or a series of controls with a timing capacity of 120 minutes the proper worm and worm gear are used, if a control having a timing capacity of 180 minutes is desired it is only necessary to change the ratio between the worm gear and worm to producing the desired revolutions.

Also it will be noted that if desired, my control device may be operated independent of the timing unit. By pulling knob 11 outwardly with a slight clockwise turn and then releasing the knob, stop pin 31 which is a double stop comes into contact with pin 32, thus closing contact points 22 and 23 and energizing the switch. Since there is slip clutch 26 between timing cam 12 and worm gear 16 the worm wear 16 is free to be turned by worm 27 without fear of breaking gear 16 or otherwise harming the switch mechanism. Since stop pin 31 is a double stop arrangement the timing cam 12 is prevented from continuing in its normal clockwise rotation by coming in contact with pin 32.

When operating the control device of my invention and utilizing both the timing and temperature features knob 10 may be turned clockwise to any predetermined temperature (the switch being actually calibrated and knob 10 being inscribed with temperature markings). Thus setting contact points 19 and 20 at a predetermined physical distance. Then knob 11 is turned counterclockwise to any predetermined time setting (the control device being previously calibrated and knob 11 being inscribed with time markings). The counterclockwise rotation of knob 11 brings together contact points 22 and 23 thus energizing motor 29. It will be noted that the present control device is energized by the closing of contacts 22 and 23. Motor 29 being energized simultaneously rotates worm 27 and cam 30. Cam 30 being rotated by worm 27 causes flexible blade 28 to flex back and forth, the number of times contact point 20 touching contact point 19 being determined by the original distance between said points. The closing of contact points 19 and 20 energizing for example a heating element. Knob 10 may be rotated to such a position where cam 13 pushes blade 18 to a point where contact point 19 is constantly touching contact point 20. Thus maximum heat would be supplied to the heating element for the entire time cycle. Worm 27 being in contact with worm gear 16 turns cam 12 clockwise, through clutch 26. When cam 12 returns to the position where blade 24 falls into escapement 21 the contact points 22 and 23 separate and the switch and heating element become de-energized.

In Fig. 6 it will be observed that power lines 34 and 35 are adapted to have connected thereacross heating unit 33. Closing of contact points 22 and 23 energizes motor 29 which in turn through cam 30 closes contact points 19 and 20 which causes the energization of heating element 33.

Figure 8:
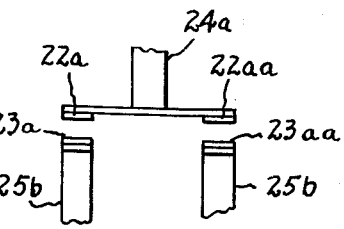
Fig. 8 is a diagrammatic drawing of the contact points used when two or more of said controls are electrically interconnected.

Turning now to Figs. 7 and 8 there will be seen a means for changing the control device of my invention so that a plurality of such control devices may be operated from a single motor. Fig. 8 diagrammatically shows a means of changing contact point 22 and 23 so that a plurality of control devices may be interconnected. New contact points 22a and 22aa are connected to a common power source blade 24a. Contact points 23a and 23aa are fixed to separated connections 25b. In other words contact points 22a and 22aa and 23a and 23aa comprise a double contact single pole switch wherein contact points 22a and 22aa are common to a single terminal and contact points 23a and 23aa are isolated from each other and connected to separate terminals. In Fig. 7 there has been illustrated a diagrammatic wiring diagram by which illustration the manner in which the several control devices are interconnected may be observed. Contact points 22b—22bb and 23b—23bb, 22c—22cc and 23c—23cc and 22d—22dd and 23d—23dd are identical with the switch of Fig. 7 to illustrate four control devices in a circuit with a single motor. In this connection it will be noted that power lines 34 and 35 are adapted to have connected thereacross several heating units 33. The heating units 33 are adapted to be separately controlled by means of individual control devices, connected as previously mentioned by flexible shafts to worm 27.

It will be observed that when the various control devices are connected in the circuit as illustrated in Fig. 7, the energization of any one heating unit as by rotation of knobs 10 and 11 on the particular switch unit, the cam 12 in such switch will close the circuit for the single motor 29 so that the motor will continue to be energized so long as any single control device is in operation. Since 22a and 22aa are common to a single terminal when control knob 11 is turned counter clockwise, 22a and 22aa simultaneously contact 23a and 23aa thus energizing motor 29 which through worm 27 and cam 30 close contacts 19 and 20. If during the time the first control device is in operation a second or third control device is turned on, the further control devices will readily be seen to cut into the motor circuit. Thus when 22a—22aa break contact simultaneously with 23a—23aa the motor will keep operating since 22b—22bb are still in contact with 23b—23bb. Fig. 7 diagrammatically shows that motor 29 can be operated by 110 volts or if desired may be operated directly on 220 volts as are the heating units 33. The same also applied to the motor illustrated in Fig. 6.

By the use of the apparatus of my invention, it is possible to provide a single control device capable of simultaneously controlling the temperature and the time of operation of an electrical appliance and still further it is possible by the use of a single motor and the interconnecting flexible shafts extending between the several control devices to variously place the control devices as desired on a range or the like and still have them control the several heating units in the desired manner. Further, it is to be noted, that in the present control device the constant speed motor is energized only when the timing contacts are closed, heretofore, in the prior art, control devices for heating circuits having a constant speed motor have been energized only by the closing of the temperature contacts, also when the time and temperature control knobs are both in the off position the load is broken on two sides thus effectively making the present control device a double pole switch.

Other modes of applying the principle of the invention may be employed, change being made as regards the details described, provided the features stated in any of the following claims or the equivalent of such be employed.

I, therefore, particularly point out and distinctly claim as my invention:

1. A control for electrical heating devices wherein a single constant speed motor simultaneously operates means for automatically controlling electrical energy input into said heating device and a timing mechanism for automatically turning off said heating device at a preselected time, comprising in combination a manually actuated temperature control shaft with a first temperature cam affixed thereto adapted to set a pair of temperature contact members a predetermined distance from each other, said contacts when in closed position adapted to supply electrical energy to said heating device, a second temperature cam actuated by said motor adapted to cyclically open and close said pair of temperature contact members, a time control cam adapted to open and close a pair of timing contact members, said pair of timing contact members when in a closed position adapted to supply electrical energy to said motor, shaft means for manually turning said time control cam wherein said pair of timing contact members are moved into a closed position and gear means actuated by said motor adapted to rotate said time control cam wherein said pair of timing contact members are moved to an open position.

2. A control for electrical heating devices wherein a single constant speed motor simultaneously operates means for automatically controlling electrical energy input into said heating device and a timing mechanism for automatically turning off said heating device at a preselected time, comprising in combination a manually actuated temperature control shaft with a first temperature cam affixed thereto adapted to manually set a pair of temperature contact members a predetermined distance from each other, said contacts when in closed position adapted to supply electrical energy to said heating device, a second temperature cam actuated by said motor adapted to cyclically open and close said pair of temperature contact members, a time control cam adapted to open and close a pair of timing contact members, said pair of timing contact members when in closed position adapted to supply electrical energy to said motor, shaft means for manually turning said time control cam counterclockwise wherein said pair of timing contact members are moved into a closed position and worm and worm gear means actuated by said motor through clutch means adapted to rotate said time control cam clockwise wherein said pair of timing contact members are moved to an open position.

3. A control for electrical heating devices wherein a single constant speed motor simultaneously operates means for automatically controlling electrical energy input into said heating device and a timing mechanism for automatically turning off said heating device at a preselected time, comprising in combination a temperature dial for manually rotating a temperature control shaft, a first temperature cam permanently affixed to said temperature control shaft and adapted to set a pair of temperature contact members a predetermined distance from each other, said contacts when in closed position adapted to supply electrical energy to said heating device, a second temperature cam permanently affixed to the motor shaft and adapted to cyclically open and close said pair of temperature contact members, a time control dial co-axial with the temperature dial and having its shaft co-axial with the temperature shaft and a time control cam affixed to said time shaft which when rotated counterclockwise is adapted to close a pair of timing contact members, said pair of timing contact members when in a closed position being adapted to supply electrical energy to said motor, worm means affixed to the motor shaft and meshed with a worm gear affixed to said time control shaft adapted through clutch means to rotate said time control shaft and cam clockwise whereby said timing contact members are moved to an open position.

References Cited in the file of this patent

UNITED STATES PATENTS

| | | |
|---|---|---|
| 2,294,573 | Potter | Sept. 1, 1942 |
| 2,427,300 | Oliver | Sept. 9, 1947 |
| 2,430,257 | Teeson | Nov. 4, 1947 |
| 2,502,823 | Clark | Apr. 4, 1950 |
| 2,503,082 | Tuttle | Apr. 14, 1950 |
| 2,548,028 | Klammer | Apr. 10, 1951 |